Dec. 5, 1933. H. C. EDWARDS 1,938,284

INTERNAL COMBUSTION ENGINE

Filed July 21, 1930 2 Sheets-Sheet 1

Inventor
HERBERT C. EDWARDS

By
Attorney

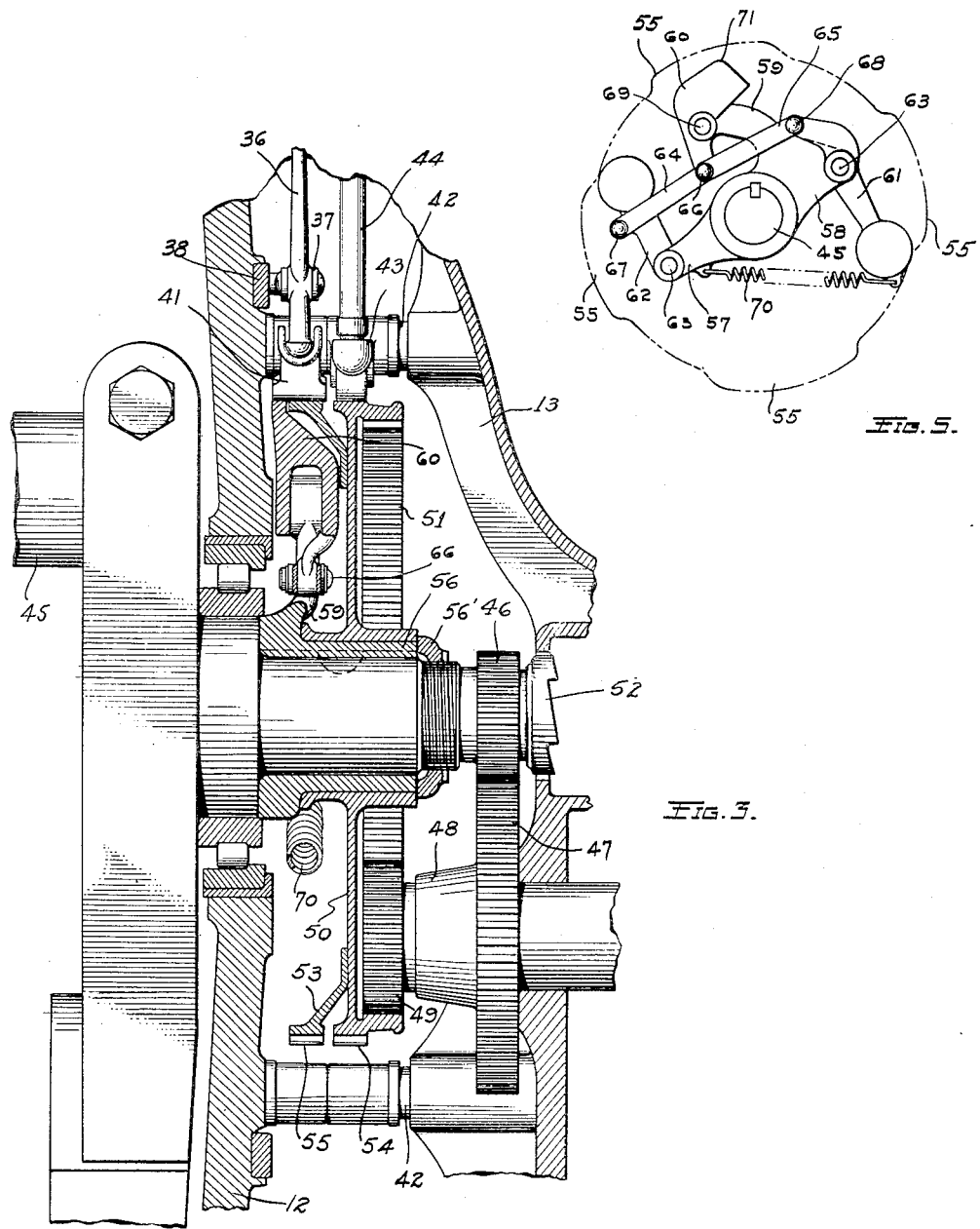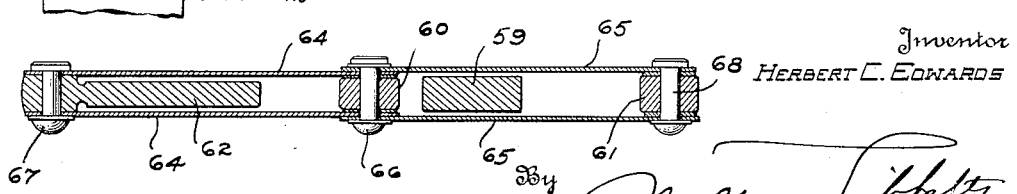

Patented Dec. 5, 1933

1,938,284

UNITED STATES PATENT OFFICE 1,938,284

INTERNAL COMBUSTION ENGINE

Herbert C. Edwards, Detroit, Mich., assignor to Packard Motor Car Company, Detroit, Mich., a corporation of Michigan Application July 21, 1930. Serial No. 469,476

8 Claims. (Cl. 123—140)

This invention relates to internal combustion engines and more particularly to engines of the compression-ignition type.

In high speed compression-ignition engines, it is required that the liquid fuel charges be injected into the compressed air charges in an atomized condition and under a pressure sufficient to penetrate well into the combustion chambers in order to cause the proper formation of the mixture so that it will ignite under compression. With one type of fuel injection mechanism, the pressure behind the fuel charges, and the atomization thereof, varies in accordance with the engine speed so that when the engine is in its low speed range, that is during idling and starting, the pressure developed behind the fuel is insufficient to assure that combustion will occur during compression of the mixed charge, and as a result, starting is very difficult and stalling of the motor often results during idling of the engine.

An object of my invention is to provide a compression-ignition type of engine with liquid fuel injection devices which are actuated above a predetermined speed by a mechanism driven by a moving engine part and which are actuated by another mechanism below the predetermined speed, the last mentioned mechanism causing a much higher pressure to be developed behind the injected fuel charges than that developed by the first mentioned mechanism under similar engine speed.

Another object of my invention is to provide two mechanisms for operating the pressure fuel injection devices of a multi-cylinder compression-ignition engine, the two mechanisms operating the devices at different rates of movement under a similar engine speed and the faster mechanism being automatically moved into operative position below a predetermined speed and moved out of operative position above the predetermined engine speed.

Still another object of the invention is to provide a compression-ignition type of engine in which two mechanisms are provided for actuating the pressure fuel ignition devices, one of said mechanisms being normally in operative relation and moved out of operative relation by means responsive to centrifugal force.

A further object of the invention is to provide fuel injection mechanism for a compression-ignition type of engine which is actuated, at any engine speed, in a manner to produce a minimum pressure behind the fuel charges which is sufficient to result in a penetration thereby of the compressed air charges to cause a mixture which will ignite during the compression cycles of the engine.

These and other objects of the invention will appear from the following description taken in connection with the drawings, which form a part of this specification, and in which:

Fig. 3 is a fragmentary sectional view of the engine taken on line 3—3 of Fig. 1;

Fig. 4 is a sectional view taken on line 4—4 of Fig. 1;

Fig. 5 is a view of the injection device actuating mechanisms, the faster mechanism being shown retracted in inoperative position.

Figure 1:
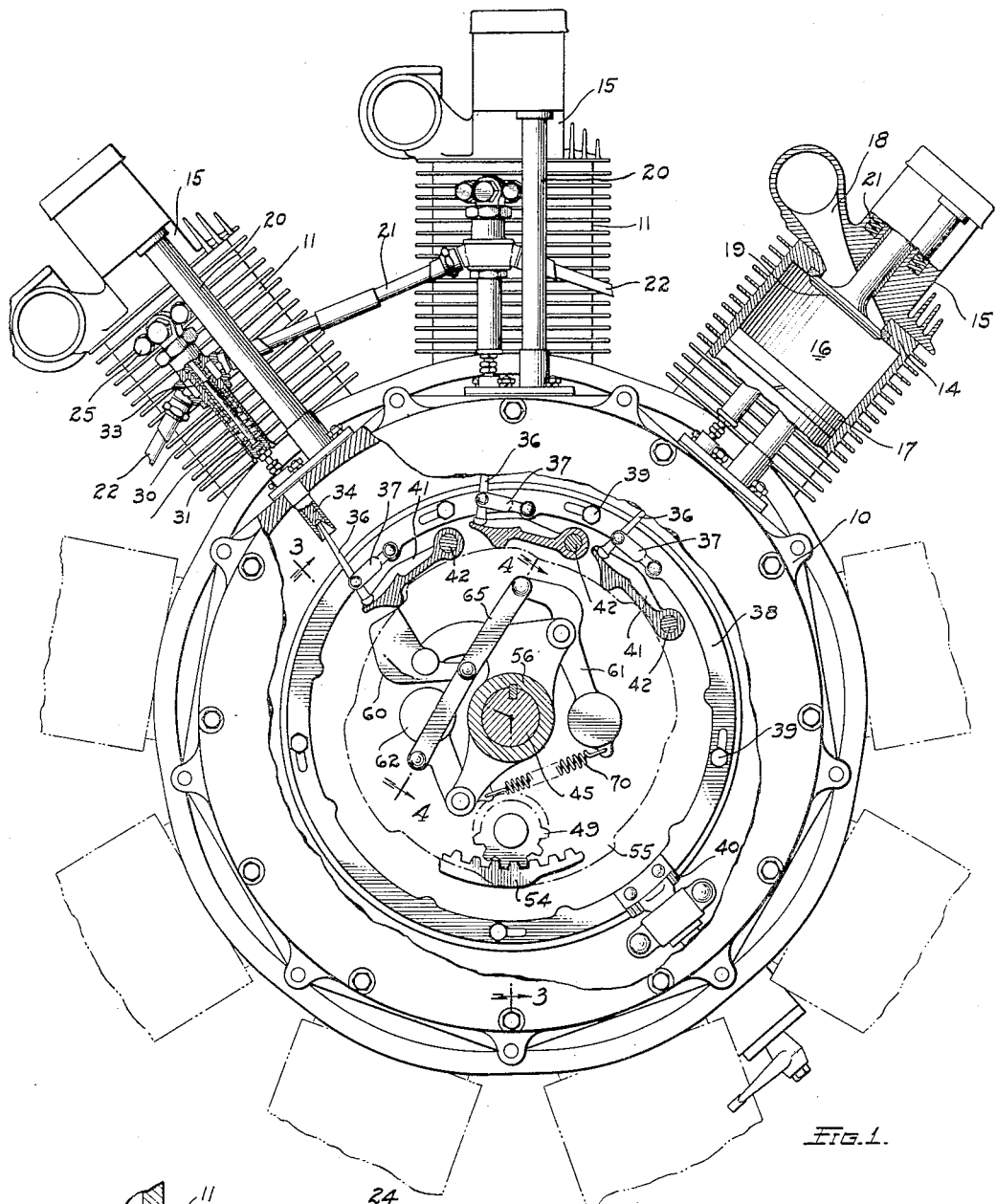
Fig. 1 is a rear end elevation of a compression-ignition type of engine, partially broken away and partially in section to show the fuel injection devices and the actuating mechanism therefor.
Figure 2:
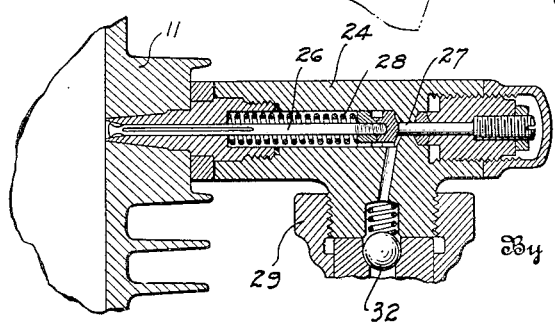
Fig. 2 is a vertical sectional view of the nozzle portion of one of the injection devices, shown associated with a fragment of one of the engine cylinders.

Referring to the drawings by characters of reference, 10 indicates the crank case of an internal combustion engine, of the Diesel or compression-ignition type, from which a plurality of cylinders 11 extend radially. The interior of the crank case is divided into two compartments by a diaphragm 12, and a removable plate 13 closes the rear end of the crank case.

The cylinders are each preferably formed as a steel forging which includes a barrel and an integral dome 14, and secured upon each of such domes is a head 15. In order to provide for air being drawn into and exhaust expelled from each of the combustion chambers 16, which are between the pistons 17 and the domes 14, I provide a single Venturi passage 18 through each associated head and dome which extends preferably at an angle to the cylinder axis and tangentially of the inner wall thereof. This arrangement of ports will cause a full delivery of air to the cylinders in a manner such that the air charges will rotate after entering the combustion chambers. In order to control the flow through each of the Venturi passages, there is provided valves 19 which are moved to open position during the air intake and exhaust strokes by suitable mechanisms which are driven from the crank shaft and extend through the crank case and housings 20. A plurality of springs 21 are associated with each valve to normally close the same.

Liquid fuel, in an atomized form and under a high pressure, is injected into each of the cylinders during the air compression strokes by means of separate injection devices, each device consisting of an associated nozzle and pump section. The nozzle sections of the several units are connected together by fuel feeding manifold sections 22 connected in circuit, and associated with a source of fuel supply and a slow speed pump (not shown).

Each nozzle includes a barrel 24 having the forward end thereof extending through an aperture in the cylinder wall, and the nozzle and pump units are secured rigidly to the cylinders by bolts 25 which extend through flanges forming part of the nozzle sections. A chamber, or passage, extends axially through the major portion of each of the nozzle sections, and arranged in each is a valve element 26 which is provided with a conical head reciprocable within the flared outer end of the associated nozzle chamber which extends adjacent the interior wall of the cylinder. Associated with the other end of each of the valve members is a stop 27, and such stop can be adjusted to regulate the inward movement of the valve heads so that they will, preferably, not quite close. A coil spring 28 is arranged to normally urge each valve into its position of nearest closure.

A pump casing 29 is screwed upon a depending neck portion of each of the nozzle bodies, and arranged within each pump casing is a barrel 30 within which a plunger 31 is reciprocated. There is a passage establishing communication between the pump barrels and the nozzle chambers, such passages having therein a one-way valve 32 which prevents return of fuel oil and air from the nozzles into the barrels. Each pump barrel and its casing are provided with a plurality of transversely extending aligned ports 33 which are arranged to communicate with the fuel feeding manifold sections 22 so that when the plungers 31 uncover such ports, oil will move into the associated pump barrels to maintain the same full of oil, such communication being cut off when the plungers move past the ports in their injection strokes.

Guided plunger push rods 34 extend into the interior of the crank case and are arranged to engage with each plunger structure and cause movement thereof in a direction to close the ports 33, and to displace fuel oil from the nozzles into the cylinders upon further movement after closing the ports. Springs 35 are arranged to normally move the plungers into a position uncovering the ports 33. A rod 36 is associated with each push rod, and such rods are pivotally connected by links 37 to a ring 38 which is retained adjacent the diaphragm 12 by bolts 39, such ring being provided with arcuate slots to permit rotation thereof. When the ring is rotated, by means of a rack and pinion 40, the links 37 will be moved and will vary the angular relation of the rods 36 relative to the push rods 34, and in this manner the stroke of the plungers 31 beyond the ports 33 can be regulated, thus varying the quantity of fuel oil injected into the cylinders. A slipper 41 is arranged to be associated with each of the rods 36, and such slippers are pivotally mounted upon the shafts 42 carried by the end wall 13 and partition 12. The slippers are provided with an arcuate surface extending longitudinally thereof against which the rods 36 are pressed by the springs 35. Mounted upon the shafts 42, beside the slippers 41, are slippers 43 and with each of which a rod 44 is associated for actuating the valve opening mechanism which extends through the housing 20.

A crank shaft 45 extends axially through the crank case and is provided adjacent its rear end with a gear 46 which meshes with a gear 47 carried by the shaft 48, and upon such shaft is fixed another gear 49. A cam 50 encircles the crank shaft and is provided with an inner ring gear 51 with which the gear 49 meshes. The gears 46, 47, 48, 49 and 51 provide a reduction drive from the crank shaft to the cam and rotate the cam in a direction opposite to that in which the crank shaft is rotated. Upon the end of the crank shaft is provided a starter jaw 52 with which a suitable device can be associated for rotating the crank shaft. Secured to the cam 50 is another cam 53, the lobe portion of which extends in a plane forwardly of and parallel with the lobe portion of the cam 50. Upon the periphery of the cam 50 is formed four lobes, one being indicated at 54, which are adapted to actuate the slipper 43 to impart an opening movement to the valves 19. Upon the periphery of the cam 53 is arranged four similar lobes 55 which rotate in a plane so that they will actuate slippers 41 for operating the fuel injection devices. It will be seen that as cams 50 and 53 are integrally secured together, they will be rotated at a reduced speed from the crank shaft and such speed is, preferably, one-eighth that of the crank shaft speed. This rate of speed is sufficient to cause a fast enough movement of the plungers 31 through the cams cooperating with the actuating mechanism therefor while the engine is under load, but below such engine speed then the movement imparted to the plungers 31 through the operation of the actuating mechanism by means of the cam 50 is too slow to produce a pressure behind the fuel charges being injected into the compressed air charges to cause atomization and a penetration of a character which will result in the formation of an intermingled air and oil mixture which will ignite under compression of the pistons 17 within the cylinders.

In order to maintain a sufficient pressure behind the fuel charges injected to cause a penetration of the air charges by the injected fuel charges which will maintain a mixture of the character which will ignite under compression when the engine is running in its lower speed range, that is the idling and starting speeds, I provide an auxiliary mechanism in place of the cam 53 which will automatically come into effective position when the engine speed is below a predetermined R. P. M. and which will automatically return to an inoperative position when the engine speed is above the predetermined R. P. M. To this end I provide mechanism for causing injection strokes of the plungers 31 which comprises a hub 56, keyed to the crank shaft, formed with three arms 57, 58 and 59, a pivoted cam 60 and a governor mechanism associated with the hub and the pivoted cam. The cam 50 is rotatably mounted upon the hub 56, and a retainer 56' is screwed upon the crank shaft to axially secure the cam 50 and hub 56 in position. The governor mechanism consists of a pair of weighted levers 61 and 62 which are pivoted by means of pins 63 to the ends of the arms 57 and 58, and pairs of link members 64 and 65 which extend respectively between the lever 62 and the cam 60, the lever 61 and the cam 60, a suitable pin 66 being utilized to pivotally connect both pairs of links with one end of the cam. A pin 67 connects the pair of links 64 with the lever 62, midway between its ends, while the pin 68 connects the pair of links 65 with the lever 61. The cam 60 is pivotally connected midway between its ends to the arm 59 by a suitable pin 69. A coil spring 70 is secured at one end to the arm 57 and at the other end to the lever 61. The levers 61 and 62 are maintained substantially in a parallel relation on opposite sides of the crank shaft due to the association of the pairs of links 64 and 65, and the weighted ends thereof are oppositely disposed so that the governor mechanism is substantially in balance. A spring 70 normally exerts a force against the arm 61 which tends to move the governor mechanism into a relation such that the lobe portion 71 of the cam will be moved beyond the periphery of the cam 53 and will thereby become effective to actuate the slippers 41, as shown in Fig. 1. As the engine speed increases, the action of the spring upon the governor device is overcome, due to centrifugal force, and the weighted ends of the levers 61 and 62 will move toward each other and thereby move the pairs of links 64 and 65 causing movement of the cam 60 in a direction such that it will rotate within a plane bounded by the lobes of the cam 53, as shown in Fig. 5, and under such circumstances the cam 60 will be held ineffective.

It will be seen that the cam 60 will be moved at crank shaft speed, so that when it is effective the movement imparted to the slippers 41, the rods 34 and 36, and the plungers 31 to cause a fuel injection stroke will be much faster than if the movement were caused by the cam 53. When the cam 60 is in effective position, it will hold the slippers 41 in a raised position so that the lobes 55 will pass thereunder and in this manner masks the cam 53 so that it is ineffective. The governor mechanism is preferably arranged so that it causes the cam 60 to become effective when the engine is running at or below idling speeds, however the adjustment of the spring 70 could be adjusted to cause the cam 60 to be moved into effective position at any desired engine speed. I have found, however, that with the engine and fuel injection mechanism herein described, the movement of the cam 53 above idling speeds of the engine is sufficient to impart a movement to the fuel pump plungers which will cause a required penetration of the air charges by the injected fuel charges to produce a mixture which will readily ignite through compression within the cylinders. The movement imparted by the cam 53 to the mechanism for actuating the pump plungers, when the engine is running at or below idling speed, is not sufficient however to cause such a penetration and atomization of the fuel charges as to result in the formation of a mixture with the compressed air charges in the cylinders of a character which will ignite upon compression in the combustion chambers, and thus the provision of a second faster moving actuating mechanism of the character herein described, which will produce a high rate of plunger movement, is very necessary and desirable in order to insure a fuel mixture such that starting of the engine can be easily accomplished and so that the engine will not stall when running at idling speeds.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an engine, the combination of a liquid fuel injection device including a nozzle and a pump; and mechanism for actuating the pump comprising an engine driven cam, an engine rotated hub, a cam pivoted to the hub, and interconnected balanced mechanism carried by the hub and connected to the cam, said balanced mechanism being responsive to centrifugal force and associated to move the pivoted cam into effective or ineffective relation relative to the engine driven cam.

2. In an engine, a pressure liquid fuel injection device including a plunger, mechanism associated to reciprocate the plunger, an engine rotated cam for actuating the mechanism to cause the plunger injection strokes above a predetermined engine speed, and means for actuating the mechanism to cause the plunger injection strokes below a predetermined engine speed, said means comprising a pivoted engine rotated cam and a centrifugal governor for controlling the pivotal position of the rotated cam.

3. In an engine, a pressure liquid fuel injection device including a plunger, mechanism associated to reciprocate the plunger, a cam for actuating the mechanism to cause the plunger injection strokes above a predetermined engine speed, said cam being rotated from the engine at a reduced speed, and another means for actuating the mechanism to cause the plunger injection strokes below a predetermined engine speed, said means comprising a hub rotated by the engine several times faster than said cam, a cam pivotally carried by the hub adapted to engage the plunger actuating mechanism, and balanced centrifugal governor mechanism carried by the hub and connected to the pivoted cam, said governor mechanism placing the pivoted cam in effective or ineffective positions.

4. In an engine, a crank shaft, a pressure liquid fuel injection device including a plunger, mechanism associated with the device to reciprocate the plunger, a cam for actuating the mechanism to cause the plunger injection strokes when the engine is running above a predetermined speed, said cam being rotated from the crank shaft at a reduced speed, and another means for actuating the mechanism to cause the plunger injection strokes when the engine is running below the predetermined speed, said means comprising a hub fixed to the crank shaft, a cam pivotally carried by the hub and adapted to engage the plunger actuating mechanism to cause effective plunger injection strokes, and balanced centrifugal governor mechanism carried by the hub and connected to the pivoted cam, said governor mechanism placing the pivoted cam in effective or ineffective positions relative to the actuating mechanism.

5. In an engine, the combination of a liquid fuel injection device including a nozzle and a pump; mechanism for actuating the pump including a cam; and another mechanism for actuating the pump comprising a member driven at a faster speed than the cam, a cam pivoted intermediate its ends to the member, and centrifugally actuated means carried by the member and pivotally connected to the pivoted cam, said centrifugally actuated means moving the pivoted cam into effective actuating relation below a predetermined engine speed and out of effective actuating relation above the predetermined engine speed.

6. In an internal combustion engine, fuel injection means comprising an injection device having a plunger, a cam associated to actuate the plunger, a crank shaft, reduction driving mechanism connected between the crank shaft and the cam, a hub fixed on the crank shaft adjacent said cam, a cam pivoted on the hub and associated to actuate said plunger when extended beyond the periphery of the cam operated at reduced speed, a pair of balanced weighted levers pivotally carried by the hub, and link means pivoted to the levers and to the cam on the hub, said levers being responsive to centrifugal force to move the pivoted cam into ineffective position during high speed operation.

7. In an internal combustion engine, fuel injection means comprising an injection device having a plunger, a cam associated to actuate the plunger, a crank shaft, reduction driving mechanism connected between the crank shaft and said cam, a hub fixed on the crank shaft adjacent said cam, a cam pivoted on the hub and associated to actuate said plunger when extended beyond the periphery of the cam operated at reduced speed, a pair of balanced weighted levers pivotally carried by the hub, link members pivoted to the levers and to the cam on the hub, and spring means associated with the hub and one of the levers for normally maintaining the pivoted cam in operative position relative to the plunger, said levers being responsive to centrifugal force to move the pivoted cam into ineffective relation against the action of the spring during high speed operation.

8. In an engine, the combination with actuating mechanism for a fuel injection pump plunger, of a cam means driven at a reduced speed by the engine for operating the actuating mechanism, and another means for operating the actuating mechanism comprising a hub driven at a faster speed than the cam, a cam pivoted on the hub, and governor means controlling the position of said pivoted cam, said pivoted cam projecting beyond the periphery of the other cam during the slower speed operation of the engine.

HERBERT C. EDWARDS.